United States Patent [19]  [11] Patent Number: 4,657,120
Farr  [45] Date of Patent: Apr. 14, 1987

[54] FLYWHEEL MECHANISMS FOR ANTI-SKID BRAKING SYSTEMS

[75] Inventor: Glyn P. R. Farr, Warwickshire, England

[73] Assignee: Lucas Industries Public Limited Company, England

[21] Appl. No.: 712,859

[22] Filed: Mar. 18, 1985

[30] Foreign Application Priority Data

Mar. 29, 1984 [GB] United Kingdom ............... 8408165

[51] Int. Cl.⁴ .............................................. B60T 8/02
[52] U.S. Cl. ................................ 188/181 A; 188/71.2; 303/116
[58] Field of Search ............ 188/181 A, 181 R, 181 C, 188/180, 181 T, 187, 71.2, 135, 18 A, 71.1; 303/113–119, 91, 24; 74/572; 192/12 R, 70.23, 103, 105 B

[56] References Cited

U.S. PATENT DOCUMENTS 4,353,440 10/1982 Farr .............................. 188/181 A

FOREIGN PATENT DOCUMENTS 0034451 8/1981 European Pat. Off. ............ 303/116
2109494 6/1983 United Kingdom .

Primary Examiner—Douglas C. Butler
Attorney, Agent, or Firm—Laff, Whitesel, Conte & Saret

[57] ABSTRACT

In a flywheel mechanism of the axially expanding type a clutch plate which is rotatable with a shaft and from which the mechanism is driven, is provided on pitch circles of greater and smaller diameters with outer and inner clutch faces with which complementary clutch faces on the mechanism are alternately engageable. This defines first and second clutch engagements of higher and lower torque settings which are operative, respectively, when the flywheel mechanism is in an inoperative brake-applying position and when the flywheel mechanism is in an operative brake-applying expanded position.

5 Claims, 1 Drawing Figure

U.S. Patent  Apr. 14, 1987  4,657,120
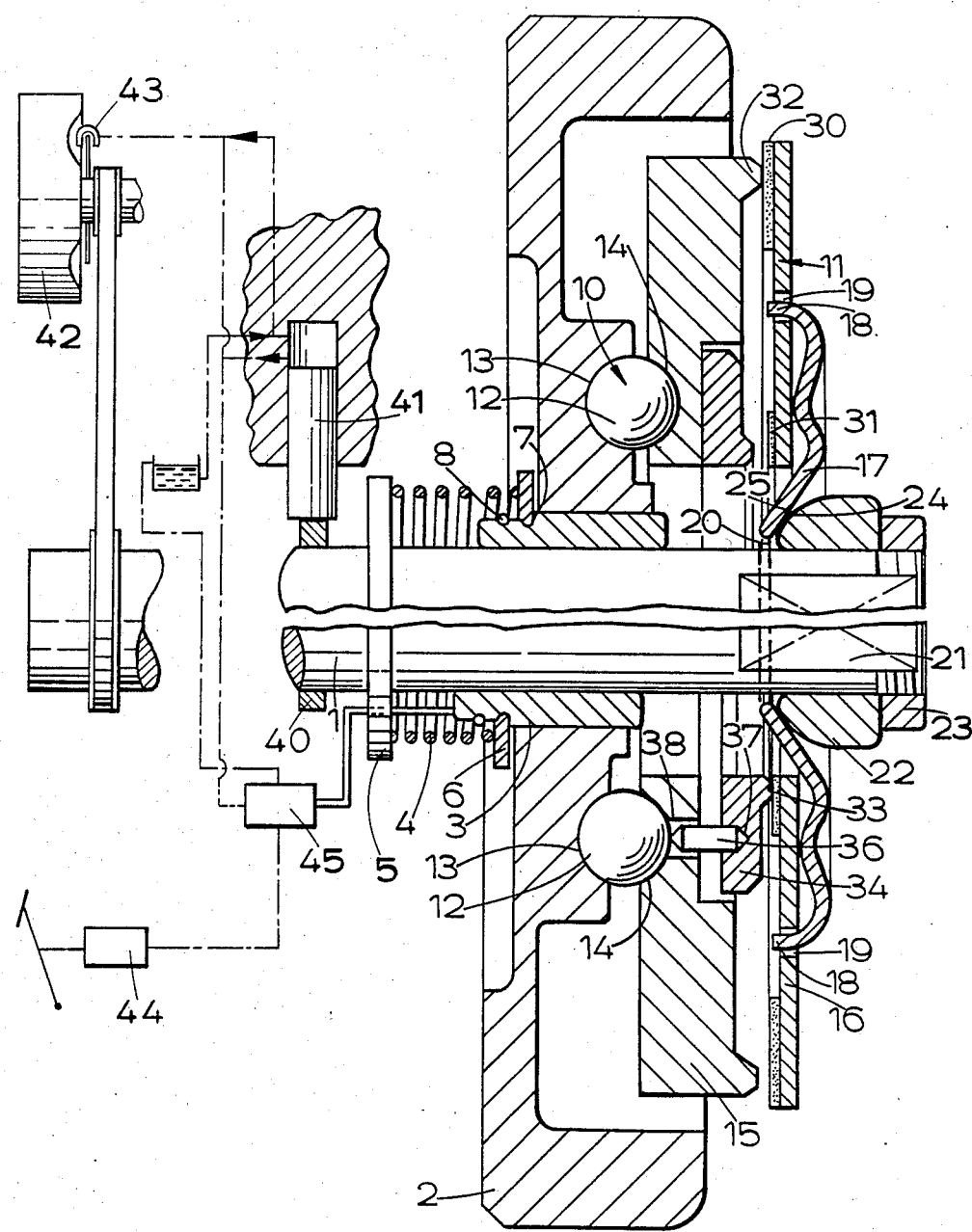

FLYWHEEL MECHANISMS FOR ANTI-SKID BRAKING SYSTEMS

This invention relates to flywheel mechanisms for anti-skid braking systems of the kind comprising a rotatable shaft adapted to be driven by a braked wheel, a flywheel which is angularly movable with respect to the shaft, camming means acting between a thrust member and the flywheel and through which rotation of the shaft is imparted to the flywheel from the thrust member, the camming means being so constructed and arranged that relative rotation between the flywheel and the thrust member as a result of excessive deceleration of the thrust member relative to the flywheel is accompanied by relative movement between the flywheel and the thrust member in an axial direction to operate pressure-regulating means controlling a brake-applying fluid pressure, and a clutch which permits the flywheel to overrun the shaft against the clutch torque. Such a flywheel mechanism will hereinafter be referred to as a "flywheel mechanism of the kind set forth".

With flywheel mechanisms of the kind set forth it is important to ensure that the clutch does not slip to permit overrun before the camming means is actuated, and accordingly it has been the practice to arrange for the clutch to slip at a torque which is considerably greater than the torque required to cause actuation of the camming means. This then creates the difficulty that the clutch may not be able to prevent "underrun" on rapid re-acceleration of a road wheel, and the extremely high levels of re-acceleration which can be encountered during anti-skid cycles demand a minimum clutch bias threshold, which is often too high for the overrun clutch.

In the specification of GA-A-2 109 494 there is disclosed a flywheel mechanism of the kind set forth in which the clutch comprises an axially biased frictional engagement between clutch driving and driven surfaces, and means is provided to reduce the clutch torque from its normal setting following camming means actuation.

The reduction in the clutch torque from its normal setting following camming means actuation enables the deceleration rate of the over-running flywheel to provide a more reliable wheel speed analogue.

In the construction disclosed in FIG. 7 of GB-A-2 109 494 the clutch comprises two clutch discs engaging with the thrust member of the camming means and the clutch torque is reduced following expansion of the camming means by reducing the frictional engagement force between one of the clutch discs and the thrust member. This is achieved by a change in the mechanical advantage of a lever acting on the flywheel, as the lever accommodates expansion of the camming means, and this, in turn reduces the magnitude of an axially directed biassed force which urges the flywheel and the thrust member towards each other, and one of the clutch discs into engagement with the thrust member.

According to our invention in a flywheel mechanism of the kind set forth a clutch plate which is rotatable with the shaft is provided on pitch circles of greater and smaller diameters with outer and inner clutch faces of annular outline with which complementary clutch faces on the flywheel mechanism are alternately engageable to define respectively a first clutch engagement at the pitch circle of greater diameter through which the flywheel is driven during spin-up during camming means actuation, and a second clutch engagement at the pitch circle of smaller diameter during overrun following camming means actuation.

The clutch torque is therefore reduced from a higher torque setting during spin-up to a lower torque setting following camming means actuation, and which is effective during overrun.

Since the torque available at spin-up is correspondingly greater than the lower limiting torque during overrun, a relatively smaller bias force is required to load the clutch in an axial direction, thereby increasing the sensitivity of the mechanism. In addition, no further mechanical agency is required to change the magnitude of the bias force between the first and second clutch engagements.

Conveniently the outer clutch face on the clutch plate is engageable with a complementary clutch face on the thrust member, and the inner clutch face on the clutch plate is engageable with a complementary clutch face on an intermediate member which is interposed between the thrust member and the clutch plate, is keyed against rotation with respect to the thrust member, and is axially movable with respect to the thrust member between a retracted position in which the outer clutch faces are engaged and the inner clutch faces are disengaged, and an advanced position which the inner clutch faces are engaged and the outer clutch faces are disengaged.

The relative axial movement between the intermediate member and the thrust member can be achieved by axially extending struts or push-rods which act between the camming means and the intermediate member and project through openings in the thrust member in order to key the two members against relative rotation.

When the camming means comprises at least two balls, and preferably three located in pairs of diametrically or angularly spaced opposed recesses in adjacent faces of the flywheel and the thrust member, and relative angular movement between the flywheel and the thrust member causes the balls to ride up the sides of the recesses which comprise ramps, causing the flywheel and the thrust member to move relatively away from each other, at the maximum extent of their relative angular movement the balls co-operate with the struts or push-rods to urge the intermediate member axially relatively away from the thrust member thereby causing engagement of the two inner clutch faces and disengagement of the two outer clutch faces.

One embodiment of our invention is illustrated in the single FIGURE of the accompanying drawing which is an axial cross-section of a flywheel mechanism for an hydraulic anti-skid braking system.

The flywheel mechanism illustrated in the drawing comprises a drive shaft 1 which is journalled for rotation in bearings in a housing and which, at an intermediate point in its length, carries an eccentric 40 for driving a pump 41 which, in a known manner, effects re-application of the brakes following brake release effected by the flywheel mechanism.

A flywheel 2 is rotatable and axially slidable relative to one end of the shaft 1 being mounted on the shaft 1 through a bushing 3 of stepped external diameter, and the other end of the shaft 1 is connected to a wheel 42 of a vehicle which is adapted to be braked by a brake 43. The flywheel 2 is biassed towards the adjacent free end of the shaft 1 by means of a compression spring 4 which encircles the shaft 1. The spring 4 abuts at one end against a radial shoulder 5 on the shaft and at the other end against a radial thrust plate 6 which, in turn, abuts against a radial shoulder 7 on the bushing 3 at a step at the change in diameter. A circlip 8 prevents accidental removal of the thrust plate 6 from the bushing 3.

The flywheel 2 is adapted to be driven from the shaft 1 through a ball and ramp camming means 10, and a clutch mechanism 11.

The ball and ramp camming means 10 is constituted by at least two diametrically opposed balls 12, and preferably three, which are received, in a known manner in complementary pairs of inclined recesses 13, 14 provided in adjacent faces of the flywheel 2 and an annular thrust member 15 which is disposed between the flywheel and a clutch plate 16. The clutch plate 16 is driven from the shaft 1 by means of a drive member 17 comprising a dish-shaped pressing which, at its outer peripheral edge, is provided with two diametrically opposed axially extending fingers 18 which are received in complementary angularly spaced openings 19 in the clutch plate 16. The drive member 17 has a central aperture 20 of non-circular outline which co-operates with a drive portion 21 of complementary outline on the shaft 1. For example, two flats may be machined on the shaft 1 for co-operation with complementary parallel edges of the aperture 20.

The force from the spring 4 is transmitted through the shaft 1 to the drive member 17 through a retainer 22 which is retained on the shaft 1 by a nut 23, and the retainer 22 has a face 24 of part-spherical outline with which an annular inclined face 25 surrounding the central aperture 20 has a rocking engagement. This allows the drive member 17 to articulate in any plane normal to the axis of the shaft 1.

The clutch mechanism 11 comprises outer and inner annular clutch faces 30, 31 on the inner face of the clutch plate 16, an outer clutch face 32 on the thrust member 15, and an inner clutch face 33 on an intermediate member 34 of annular outline which is disposed between the clutch plate 16 and the thrust member 15. The outer faces 30 and 32 are located on a common pitch circle of substantially greater diameter than that on which the inner clutch faces 31 and 33 lie. The intermediate member 34 is axially movable with respect to thrust member 15 between a retracted position shown in the upper portion of the single FIGURE of the drawing in which the outer clutch faces 30 and 32 are engaged and the inner clutch faces 33 and 31 are disengaged, and an advanced position shown in the lower portion in which the inner clutch faces 33 and 31 are engaged with the outer clutch faces 30 and 32 disengaged.

The position of the intermediate member 34 with respect to the thrust member 15 is determined by the position of the balls 12 with respect to their respective pairs of recesses 13, 14, and relative circumferential movement between the balls 12 and the recesses 14 causes an axial movement to be transmitted to the intermediate member 34 through axially arranged thrust members or struts 36 which correspond in number to the balls 12, are received at their outer ends in recesses 37 in the intermediate member 34, and project at their inner ends into the respective recesses 14 in the thrust member 15 through openings 38 in the thrust member 15. The openings 38 are provided in the thrust member 15 at the circumferentially outermost ends of the recesses 14. Thus, when the flywheel mechanism is in an expanded position shown in the upper portion of the FIGURE of the drawings, the balls 12 are disengaged from the struts 36 to allow the intermediate member 34 to assume the retracted position.

The operation of the flywheel mechanism will now be described. In the upper portion of the single FIGURE of the drawing the parts of the mechanism are shown in the positions they occupy when the deceleration of the shaft 1 does not exceed the deceleration threshold corresponding to the deceleration of the flywheel 2 at which the camming means 10 is expanded.

On braking of the vehicle wheel 42 by the application of hydraulic pressure to the brake 43 from brake-applying pressure means 44, in a potential skid situation, the initial deceleration of the shaft 1 by the vehicle wheel results in a corresponding deceleration of the flywheel 2, the deceleration torque being conveyed from the shaft 1 by way of the drive member 17, and the clutch plate 16, and the engaged outer clutch faces 30, 32, and the engagements of the balls 12 with the walls of their respective pairs of recesses 13 and 14. In this condition the clutch faces 30, 32 are urged into full engagement by the load in the spring 4 to provide a maximum torque setting of the clutch assembly and ensure that the outer clutch 30, 32 does not slip prior to expansion of the camming means.

When the deceleration of the shaft 1 exceeds the deceleration threshold of the camming means 10, the flywheel 2 is permitted to move angularly relative to the thrust member 15 and the camming action of the balls 12, as they move relatively up ramps defined by the edges of the recesses 13, 14, causes the flywheel 2 to move relatively away from the thrust member 15 and the clutch plate 16 with the bushing 3 sliding on the shaft 2 against the load in the spring 4. This operates brake control modulator means 45 mechanically mechanically to cause pressure-regulating means incorporated in the modulator means 45 to isolate the brake applying fluid-pressure means 44 from the brake 43, release the pressure applied to the brake 43, and bring the pump 41 into operation.

When the camming means 10 has expanded, the balls 12 engage with the struts 36 to urge the intermediate member 34 axially as shown in the drawing, in turn to cause the inner clutch faces 33 and 31 to engage, and affect disengagment of the outer clutch face 32 from the clutch face 30 by further axial movement of the flywheel 2 away from the clutch plate 16 but now accompanied by an equivalent axial movement of the thrust member 15.

Since the pitch circle diameter of the clutch 31, 33 is less than that of the clutch 30, 32 this has the effect of reducing the effective torque of the clutch assembly 11 and, as a consequence, of enabling the flywheel 2 to overrun the shaft 1 and be subjected to a relatively low deceleration torque by the clutch assembly 11, now constituted by the engagement of the faces 31 and 33.

Since the torque exerted on the thrust member 15 and transmitted through the struts 36, which act as drive pins, remains substantially constant, the net torque of the clutch assembly 11 is reduced over a normal torque setting, and the clutch torque exerted on the overrunning flywheel 2 is therefore less than the normal clutch torque.

When the speed of the decelerating flywheel 2 coincides again with the speed of the shaft 1, the camming means 10 is deactuated and the flywheel 2 moves axially relative to shaft 1 to return to its normal position with the balls 12 disengaging from the struts 36. During this return movement of the flywheel 2 the pressure-regulating brake control modulator means 45 is restored to its initial position with the brake 43 being re-applied by pressure from the pump 41. The clutch faces 31 and 33 disengage, and the outer clutch faces 30, 32 re-engage. This reinstates the normal torque of the clutch assembly 11 to enable the shaft 2 to accelerate the flywheel 2 at a substantially greater rate than the previous rate of deceleration of the overrunning flywheel 2.

I claim:

1. A flywheel mechanism for vehicle anti-skid braking systems comprising a rotatable shaft adapted to be driven by a braked wheel, a flywheel which is angularly movable with respect to said shaft, a thrust member, camming means acting between said thrust member and said flywheel and through which rotation of said shaft is imparted to said flywheel from said thrust member, said camming means being so constructed and arranged that relative rotation between said flywheel and said thrust member as a result of excessive deceleration of said thrust member relative to said flywheel is accompanied by relative movement between said flywheel and said thrust member in an axial direction to operate pressure-regulating means controlling brake-applying fluid pressure, and a clutch which permits said flywheel to overrun said shaft against clutch torque, a clutch plate which is rotatable with said shaft and said flywheel mechanism are both provided on pitch circles of greater and smaller diameters with outer and inner clutch faces of annular outline, said inner and outer clutch faces being alternately engageable to define respectively a first clutch engagement at the pitch circle of greater diameter through which said flywheel is driven during spin-up during actuation of said camming means, and a second clutch engagement at the pitch circle of smaller diameter during overrun following actuation of said camming means.

2. A flywheel mechanism as claimed in claim 1, wherein said outer clutch face on said clutch plate is engageable with a complementary clutch face on said thrust member, and said inner clutch face on said clutch plate is engageable with a complementary clutch face on an intermediate member which is interposed between said thrust member and said clutch plate, is keyed against rotation with respect to said thrust member, and is axially movable with respect to said thrust member between a retracted position in which said outer clutch faces are engaged and said inner clutch faces are disengaged, and an advanced position which said inner clutch faces are engaged and said outer clutch faces are disengaged.

3. A flywheel mechanism as claimed in claim 2, wherein axially extending struts act between said camming means and said intermediate member to achieve said relative axial movement between said intermediate member and said thrust member and said struts project through openings in said thrust member in order to key said thrust member and said intermediate member against relative rotation.

4. A flywheel mechanism as claimed in claim 3, in wherein said camming means comprises at least two balls located in pairs of opposed recesses in adjacent faces of said flywheel and said thrust member, and relative angular movement between said flywheel and said thrust member causes said balls to ride up said sides of said recesses which comprise ramps, causing said flywheel and said thrust member to move relatively away from each other, at said maximum extent of their relative angular movement said balls co-operate with said struts or to urge said intermediate member axially relatively away from said thrust member thereby causing engagement of the said inner clutch faces and disengagement of said two outer clutch faces.

5. A flywheel mechanism as claimed in claim 4, wherein said flywheel is both rotatable and axially slidable with respect to said shaft and is axially movable with respect to said shaft through first and second successive distances to actuate brake control modulator means against the load in a clutch bias spring, said first distance comprising axial movement of said flywheel relative to said thrust member and said intermediate member as said balls ride up said ramps, and said second distance comprising the axial movement of said flywheel and said thrust member relative to the intermediate member which is urged in an opposite direction by said axially extending struts.

* * * * *